United States Patent [19]

Howard, Jr.

[11] Patent Number: 5,049,597

[45] Date of Patent: * Sep. 17, 1991

[54] IMPACT RESISTANT FILLER-CONTAINING POLYMER/ELASTOMERIC FIBER COMPOSITES

[75] Inventor: Edward G. Howard, Jr., Hockessin, Del.

[73] Assignee: E. I. Du Pont de Nemours and Company, Wilmington, Del.

[ * ] Notice: The portion of the term of this patent subsequent to Sep. 16, 2003 has been disclaimed.

[21] Appl. No.: 332,793

[22] Filed: Apr. 3, 1989

Related U.S. Application Data

[63] Continuation-in-part of Ser. No. 96,098, Sep. 11, 1987, abandoned.

[51] Int. Cl.$^5$ .............................................. C08L 63/00
[52] U.S. Cl. .................................... 523/457; 524/425; 524/424; 524/427; 524/430; 524/437
[58] Field of Search ............... 524/425, 424, 427, 430, 524/437

[56] References Cited

U.S. PATENT DOCUMENTS

| | | | |
|---|---|---|---|
| 3,686,048 | 8/1972 | Schirtzinger | 156/161 |
| 3,709,754 | 1/1973 | Medler | 156/161 |
| 3,817,806 | 6/1974 | Anderson et al. | 156/161 |
| 4,612,241 | 9/1986 | Howard, Jr. | 428/294 |
| 4,677,142 | 6/1987 | Sole | 523/206 |

FOREIGN PATENT DOCUMENTS 8304039  11/1983  World Int. Prop. O. .

Primary Examiner—Paul R. Michl
Assistant Examiner—Yong S. Lee

[57] ABSTRACT

The invention provides high impact resistant heat formable composites comprising an addition polymer or copolymer, a metal oxide or metal carbonate filler and oriented thermoplastic elastomeric fibers.

23 Claims, No Drawings

IMPACT RESISTANT FILLER-CONTAINING POLYMER/ELASTOMERIC FIBER COMPOSITES

This application is a continuation-in-part of copending application U.S. Ser. No. 07/096,098, filed Sep. 11, 1987 abandoned.

FIELD OF THE INVENTION

This invention relates to composites having improved impact resistance and heat formability.

BACKGROUND OF THE INVENTION

Many modern plastics lack sufficient strength for use as structural materials. The reinforcement of otherwise unsuitable plastics with fibers of glass, boron, graphite, and metal is known in the art. Reinforced plastics are replacing conventional materials in a variety of applications, including load-bearing structural members. The shift in choice is based on economic advantages, simplified fabrication, freedom from corrosion, and lower weight. The preparation of stronger, lighter materials with high impact resistance is a highly desirable objective.

U.S. Pat. No. 3,817,806, issued to Anderson et al., discloses a method for prestressing reinforced thermoset resins. Fibers held under tension are encapsulated with thermosetting resin. The reinforced resin may be formed into rigid structures. The patentees disclose the use of fiberglass fibers with ester based, acid based, or amine based resin. Shaped materials prepared by the disclosed method are disclosed as having structural integrity and a tendency to resist deformation.

U.S. Pat. No. 3,709,754, issued to Medler, discloses a method of preparing construction members of glass fibers impregnated with a hardened resin. Layers of glass fiber fabric impregnated with a hardenable resin are wrapped around glass fiber rods bounded together under tension with hardened binder resin. Construction members prepared by the disclosed method demonstrate high strength and resistance to lateral bending and flexing.

U.S. Pat. No. 3,686,048, issued to Schertzinger, discloses a process for preparing multilayer fiber reinforced structures. Parallel fibers are bonded together under tension with a small amount of thermoplastic or thermosetting resin and heated to form a flexible sheet. The sheet comprises a web of fibers connected by resin bridges. A liquid thermoplastic or thermosetting matrix is applied to single or multiple layers of the reinforcing sheets to form fiber reinforced structures. The patentee specifically discloses the preparation of sheets with glass fibers.

U.S. Pat. No. 4,612,241, issued to Howard, Jr., discloses an impact resistant composite consisting essentially of a polymer or polymer precursor and oriented thermoplastic elastomeric fibers. The polymer or polymer precursor forms, without the elastomeric fibers, a neat polymer matrix having an elongation of less than about 10%. The thermoplastic elastomeric fibers are, during preparation of the composite, embedded in the polymer or polymer precursor under from about 0 tension to tension only sufficient to eliminate slack, capable of shrinking, and present in the composite in an amount of from about 1 to about 95 percent by weight of composite. The composite has an elongation of at least 10% greater than the elongation of the neat polymer matrix.

SUMMARY OF THE INVENTION

The present invention provides an impact resistant composite comprising a polymer selected from the group consisting of addition polymer and addition copolymer, a filler selected from the group consisting of metal oxide, metal carbonate silicon oxide and mixtures thereof, provided said metal is not an alkali metal, and oriented thermoplastic elastomeric fibers.

DETAILED DESCRIPTION OF THE INVENTION

The composites of the present invention have improved impact resistance over similar compositions without thermoplastic elastomeric fibers. In addition, the composites of the present invention have higher tensile modulus and hardness compared to similar compositions without filler. The composite is able to tolerate stresses and impacts that would destroy the filler-containing polymer without the thermoplastic elastomeric fibers. In addition, the composites of the present invention are heat formable.

The composite of the present invention comprises filler-containing polymer and oriented thermoplastic elastomeric fibers. As used herein, the expression "thermoplastic elastomeric fibers" means fibers prepared from thermoplastic polymer that posses elastomeric memory, and become soft and moldable by heat. The thermoplastic elastomeric fibers absorb and distribute forces applied to the composite, and the polymer matrix serves to maintain shape and to help in distributing forces uniformly to the fibers. The polymer filler enhances the impact resistance of the resulting composite.

Thermoplastic elastomeric fibers suitable for use in the present invention should be capable of generating tension from about 0.01 to about 2 g/denier. Bonding between the polymer and the fibers allows the fibers to retain tension in the resulting composite. The placement of the fibers in the polymer matrix is not critical. The fibers are embedded in a polymerizable polymer precursor, containing an appropriate filler, which is then polymerized to form the composite of the invention. The fibers embedded in polymer precursor develop tension as the precursor is polymerized. Tension developed in the composite exceeds that necessary to eliminate slack in the free fibers and generally will be at least about 0.01 g/denier. The fiber content of the resulting composite can be from about 0.5% to about 50% by weight, preferably from about 1% to about 20% by weight, and more preferably 1% to about 10% by weight. A fiber content of 5% is most preferred. The composite can be prepared in a variety of forms including sheets and blocks. Sheets of the composite can be heat-formed into curved structures having structural integrity.

In the composite of the present invention, the polymer matrix can be a thermoplastic or thermosetting polymer. Polymers suitable for the composite should be compatible with and adhesive to the thermoplastic elastomeric fiber. Preferably, the polymer matrix is amorphous or semicrystalline thermoplastic. The polymer matrix may be selected from addition polymers selected from the group consisting of polystyrene, polymethacrylate esters such as, polymethyl methacrylate and polybutyl methacrylate, polyacrylate esters such as polyethyl acrylate and polybutyl acrylate, thermoset polyester, and epoxy. Preferably, the addition polymer matrix is polystyrene or polymethyl methacrylate. The Polymer matrix may also be selected from addition copolymers selected from the group consisting of copolymers of methyl methacrylate and butyl methacrylate, copolymers of styrene and methyl methacrylate, copolymers of methyl methacrylate and a polyfunctional addition monomer, copolymers of styrene and a polyfunctional addition monomer and polymers of polyurethanes and polyureas, made from comonomers, of the reaction molding (RIM) type. Illustrative polyfunctional addition monomers are methacrylate esters of pentaerythritol, tris(hydroxymethyl)ethane, and glycols. Preferred addition monomers include compounds of the formula

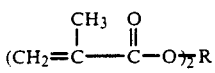

wherein
R is —$(CH_2)_n$—
wherein
n > 1.

Preferably, the monomer is a compound wherein n=2, namely ethylene glycol dimethacrylate. Preferably, the addition copolymer matrix is a copolymer of methyl methacrylate and ethylene glycol dimethacrylate. It will be appreciated that this preferred copolymer will be methyl methacrylate cross-linked by ethylene glycol dimethacrylate.

Suitable fillers include metal oxides, metal carbonates silicon oxides and mixtures thereof, wherein the metal is other than an alkali metal. Preferred oxides are $Al_2O_3 \cdot 3H_2O$, and $SiO_2$. In addition, clays according to the formula

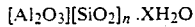

wherein n is an integer from 1 to about 7.4 and X is an integer from 0 to about 4 are suitable. Preferred metal carbonates are $CaCO_3$, $MgCO_3$ and $ZnCO_3$. The most preferred filler is $Al_2O_3 \cdot 3H_2O$. The filler may be used in a weight range of from about 30% to about 80%. More preferred is 40% to 70%, and most preferred is 50% to 65%.

These oxides and carbonates are mixtures of various size particles which are predominantly larger than 1 micron. If the particle sizes were predominantly lower than 1 micron, filler viscosity would become so high that manipulation of the mixture would be difficult. The filler composition found to be effective for the instant process has at least 70% of the particles larger than 1 micron.

In the composite of the present invention suitable thermoplastic elastomeric fibers are oriented and capable of developing tension when embedded in the polymerizing polymer precursor. Suitable thermoplastic elastomeric fibers can be prepared from any polymer that consists of a soft elastomeric segment and a hard crystalline segment. A partial list of suitable soft segments includes polytetramethylene oxide, ethylene oxide, polydienes, polyaliphatic diacid esters with aliphatic diols and copolymers of propylene oxide and tetrahydrofuran. A partial list of suitable hard segments includes polyurethanes, terephthalates, isophthalates, and polyamides. Fibers suitable for the present invention should adhere to the polymer matrix, and should be capable of shrinking when heated or exposed to organic solvents or monomers. The melting point of the fibers should be greater than the temperature required to prepare the composite. In addition, selected fibers should not be capable of dissolving in the polymer or polymer precursor. Preferred fibers are selected from the group consisting of polyester elastomers, such as polytetramethylene terephthalate, polyester/polyether elastomers, polyamide/polyester/polyether elastomers, and polyester/polyurethane elastomers. Most preferably, the fibers are polyester/polyether elastomers. Preferred polyester/polyether elastomers are described in U.S. Pat. Nos. 3,763,109; 3,766,146; and 3,651,014, which are incorporated herein by reference. The polyester/polyether elastomers and polyester/polyurethane elastomers are available commercially from E. I. du Pont de Nemours and Company under the registered trademarks Hytrel and Lycra. The copolymers of butylene adipate and meta-phenylene diisocyanate/butanediol are available commercially from B. F. Goodrich Chemical Co. under the registered trademark Estane. The elastomeric fibers should be oriented, preferably having a draw ratio of from about 1.2 to 4.5. In general, a higher orientation, i.e., a higher draw ratio, will result in a composite having a higher impact resistance. In general, orientation may be produced by pulling the fiber. Individual filaments in the fibers should have a denier of about 1 to 10. Sheath/core fibers prepared from combinations of two different elastomers by procedures well-known in the art are also suitable. In general, composites according to the present invention may be prepared according to the following general procedure.

(1) A mix of polymer precursor, filler and polymerization initiator is prepared and maintained at a temperature of about 0° C. Advantageously, a sufficient amount of polymer is dissolved in the mix to both increase the viscosity of the mix and to lower the heat of polymerization;

(2) The mix is then poured into a mold which is advantageously lined with a release film such as polyvinyl alcohol;

(3) Elastomeric fibers are then sprayed onto the surface of the mix, such as by feeding the fibers through an aspirator which is fed with compressed air. Alternatively, the fibers may be uniformly dispersed throughout the mix. If desired, the fibers may be carefully placed onto the surface of the mix to ensure uniform alignment, which is not, however, critical to the invention;

(4) The mix—if covered with a top layer of fibers—is covered with a top layer of mix and covered with a release film such as polytetrafluoroethylene (Teflon ®) available from E. I. du Pont de Nemours & Co., Inc., Wilmington, Delaware). The top layer of mix is forced into the fiber layer by any convenient means such as a roller;

(5) A thermocouple is attached to the surface to monitor the reaction temperature, and the whole mold is wrapped with insulation to conserve the heat of polymerization. The temperature will usually reach about 100° C. in a matter of minutes, at which point the polymerization is complete and the composite fully prepared.

(6) The resulting composite is removed from the mold and is cut into desired shapes. If desired, the composite can be thermally formed into curved shapes by heating to about 140° C.

The invention is further described by the following examples in which all parts and percentages are by weight and degrees are Celsius.

EXAMPLE 1

A composite was prepared with a matrix of cross-linked polymethyl methacrylate containing 65% alumina trihydrate powder and polyester/polyether elastomeric fibers prepared from a polymer sold commercially by E. I. du Pont de Nemours and Company under the registered trademark Hytrel (type 7246). The fibers were prepared by melt spinning and oriented by extending the cooled fiber. The oriented fiber had a draw ratio of about 3. Two metal frames (15 cm × 15 cm × 33 mil), each with a 9 cm × 9 cm hole cut out in the center, were placed together to form a frame of double thickness. Seventeen grams of Hytrel® type 7246 fiber were wound around the double frame to cover over both sides of the hole. A flat Teflon® (polytetrafluoroethylene) plate was attached to each face of the fiber-wrapped frames with epoxy cement, which was applied around the frames near the edges of the faces. After the epoxy cement cured, the two frames were separated by cutting the fibers where the two frames were joined. The Teflon® plates were removed, leaving the fibers held in place on the frames by the epoxy cement. Each resulting frame had a single layer of uniformly aligned attached fibers. A shallow box, large enough to accomodate the frames, was lined with a release film of polyvinyl alcohol. A mixture consisting of 975 grams of aluminum trihydrate (Alcoa C-33), 497 grams of methyl methacrylate monomer containing 20% polymethyl methacrylate (MW 50,000), 1% ethylene glycol dimethacrylate, and 28.11 grams of free radical initiator were poured into the shallow boxes. The mixture was covered with polyvinyl alcohol film and compacted with a squeegee roll. An exothermic reaction occurred which raised the temperature to 100°. A composite was formed after 20 minutes. The resulting composite contained 3.1% fiber. The fibers in the composite were quite close to one surface.

Test bars were cut from the composite to measure 2 in × 2 in × ¼ in (5.1 cm × 5.1 cm × 0.6 cm). Both sides of the test bars were subjected to the Gardner Falling Dart Test. A piece of matrix material, prepared as described above—but without fibers—shattered when impacted with 3 inch pounds (3.46 Kg cm) of impact. The composite made as described above withstood 10 inch pounds without shattering. When impacted with 3 inch pounds (3.46 Kg cm) or more, the composite developed cracks. Cracks always developed on the surface not receiving the impact. If the fibers were located close to the surface not receiving the impact, very fine cracks developed. If the fibers were located closer to the surface receiving the impact, much larger cracks developed only on the opposite surface.

In another test, pieces of composite and pieces of fiber free matrix material were heated to 140° and bent into "U" shapes. The matrix without fibers tore. The composite of the Example did not. Thus, flat sheets of composite can be hot-formed into curved shapes.

EXAMPLE 2

A composite was prepared as in Example 1 with the exception that the elastomeric fibers were arranged in a random manner, i.e., nonuniform alignment. The fibers were drawn into the suction arm of a glass aspirator with no internal valve. As compressed air was passed through the venturi section of the aspirator, the fibers were pushed out of the aspirator and deposited on the layer of mixture in a random manner. The deposited fibers were pushed into the mixture and a second layer of mixture was added on top of the fibers. A second layer and third layer of fibers were added similarly. The resulting combination spontaneously generated heat and formed a composite. The resulting composite contained three layers comprising 24 g of fibers and had a thickness of 1.6 cm (☐in). The composite contained no visible voids. The bottom layer of fibers was 3 to 4 mm from the bottom face of the composite.

Test pieces of the composite measuring 5.1 × 5.1 cm (2 × 2 in) were cut from the composite and the edges were painted with a solution of 15% polymethyl methacrylate in methylene chloride. A 1.3 cm (½in) thick piece of similar fiber free material was prepared as described above. The composite and the fiber free material were subjected to falling dart impact tests. The composite did not break or crack under 115 Kg cm (100 in lbs) but did shatter under 138 Kg cm (120 in lbs). The fiber free material did not shatter under 46 Kg cm (40 in lbs), but did shatter under 58 Kg cm (50 in lbs).

EXAMPLE 3

This Example shows that the composites of the invention can be hot formed. The composite was made as described in Example 2 and contained 3% fibers which were located on one side of a ¼in. thick piece. Corian® (E. I. du Pont de Nemours & Co., Inc., Wilmington, Delaware), a fiber free polymer matrix containing filler material, was used for comparative testing.

Pieces of Corian® sheet, either ¼ or ½ in thick, were softened at 140° and bent. The sections under stress slowly tore.

Pieces of the composite in accordance with the present invention were similarly heated and bent into "U" shapes. No tears in the composite resulted from the bending, whether the fibers were closest to the inside or outside of the resulting "U".

The piece of composite was also tested by the Gardner Falling Dart Test. Cracks developed on the side opposite to that to which the fibers were closest when the material received 8 in lbs or 12 in lbs of impact. The material shattered when subjected to 16 in lbs of impact.

EXAMPLE 4

This Example uses, as the mineral filler, powdered CaCO₃. The general procedure of Example 2 was used in that the Hytrel® fibers were placed in a random pattern and only one layer of fibers were used. The reaction mixtures were prepared as follows:

A resin kettle was charged with 1000 g of powdered CaCO₃ (Gamma Sperse 6532, Georgia Marble Co., Atlanta, GA, having about 13% of the particles with equivalent spherical diameters less than 1 micron, about 72% with diameters of between 1 and 10 microns and 15% with diameters greater than 10 microns), methyl methacrylate (635 g) containing 20% polymethyl methacrylate and 1% ethylene glycol dimethacrylate, and 60 g more of methyl methacrylate. This mixture was cooled to 0° C. at which point 25.41 g of free radical initiator was added. After degassing, by evacuating the kettle until foaming stopped, the mixture was poured into a 12 inch by 17 inch shallow box lined with polyvinyl alcohol fiber and a ferrochrome plate. One half of the mixture was covered with 50 g of a random matte of the Hytrel® fibers of Example 2. The fibers were covered with a Teflon® film and the fibers were pressed into the polymerizing mixture with a roller. When the fibers were wet, the Teflon® film was removed and more mixture, (at room temperature) was added. After covering with a second ferrochrome plate, the polymerization was allowed to proceed. The resulting composite material had a very smooth surface. The modified section contains 5.3% Hytrel ® fibers.

The composite material was cut into 2 inch by 2 inch squares and subjected to the Gardner Falling Dart Impact testor.

A sample of material, 318 mils thick, which did not contain fibers shattered at 5 inch pounds.

A sample of composite material with fibers, 320 mils thick, with 5.3% fibers showed no effect at 6 and 8 inch pounds. Slight cracks at the side opposite the impact were seen when the sample was subjected to 10 inch pounds of impact.

A sample of composite material, with fibers 335 mils thick, with 5.3% fibers showed cracks only on the side opposite the side with fibers even when subjected to 16 inch pounds of impact.

Although preferred embodiments of the invention have been illustrated and described hereinabove, it is to be understood that there is no intent to limit the invention to the precise embodiments described and it is further understood that the right is reserved to all changes and modifications which fall within the scope of the claims.

What is claimed:

1. An impact resistant, heat formable composite comprising a polymer selected from the group consisting of addition polymers and addition copolymers, a filler selected from the group consisting of metal oxide, metal carbonate silicon oxide and mixtures thereof, provided said metal is not an alkali metal, and oriented thermoplastic elastomeric fibers.

2. The composite of claim 1 wherein the addition polymer is selected from the group consisting of polystyrene, polymethacrylate esters, polyacrylate esters, thermoset polyester, and epoxy resin.

3. The composite of claim 2 wherein the polymethacrylate ester is polymethyl methacrylate or polybutyl methacrylate and the polyacrylate ester is polyethyl acrylate or polybutyl acrylate.

4. The composite of claim 1 wherein the addition copolymers is selected from the group consisting of copolymers of methyl methacrylate and butyl methacrylate, copolymers of styrene and methyl methacrylate, and copolymers of methyl methacrylate and a polyfunctional addition monomer.

5. A composite of claim 1 wherein the addition polymer is selected from the group consisting of polystyrene and polymethyl methacrylate.

6. The composite of claim 1 wherein the addition polymer is polymethyl methacrylate.

7. The composite of claim 1 wherein the addition copolymer is a copolymer of methyl methacrylate and a polyfunctional addition monomer.

8. The composite of claim 7 wherein the polyfunctional addition monomer is a compound of the formula

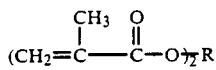

wherein
R is $-(CH_2)_{\overline{n}}$
wherein $n > 1$.

9. The composite of claim 8 wherein $n = 2$.

10. The composite of claim 1 wherein the filler is selected from the group consisting of $Al_2O_3.3H_2O$, $SiO_2$, mixtures thereof, and $[Al_2O_3].[SiO_2].XH_2O$ where n is an integer from 1 to about 7.4, and X is an integer from 0 to about 4.

11. The composite of claim 10 wherein the particle size of 70% of said metal oxide filler is 1 micron or greater.

12. The composite of claim 1 wherein the metal carbonate is selected from the group consisting of $CaCo_3$, $MgCO_3$, $ZnCO_3$ and mixtures thereof.

13. The composite of claim 12 wherein the particle size of 70% of the metal carbonate filler is 1 micron or greater.

14. The composite of claim 1 wherein the oriented thermoplastic elastomeric fibers are selected from the group consisting of polyester elastomers, polyester/polyether elastomers, polyamide/polyester/ polyether elastomers, and polyester/polyurethane elastomers.

15. The composite of claim 14 wherein the thermoplastic elastomeric fibers are polyester/ polyether elastomers.

16. The composite of claim 7 wherein the filler is $Al_2O_3.3H_2O$ or $CaCO_3$.

17. The composite of claim 9 wherein the filler is $Al_2O_3.3H_2O$ or $CaCO_3$.

18. The composite of claim 9 wherein the filler is $Al_2O_3.3H_2O$.

19. The composite of claim 18 wherein the filler is $Al_2O_3.3H_2O$.

20. The composite of claim 19 wherein the thermoplastic elastomeric monomer is polyester/polyether elastomer.

21. The composite of claim 11 wherein the metal oxide is $Al_2O_3.3H_2O$.

22. The composite of claim 13 wherein the metal carbonate is $CaCO_3$.

23. The composite of claim 1 wherein the addition copolymers are selected from polymers of polyurethanes and polyureas, made from comonomers, of the reaction injection molding type.

* * * * *